US007129278B2

(12) United States Patent
Kayima et al.

(10) Patent No.: US 7,129,278 B2
(45) Date of Patent: Oct. 31, 2006

(54) AQUEOUS POLYMER DISPERSIONS

(75) Inventors: Paul M. Kayima, Strongsville, OH (US); Joseph L. McJunkins, Berea, OH (US); James K. Marlow, Macedonia, OH (US); Madhukar Rao, Twinsburg, OH (US); Richard F. Tomko, North Olmsted, OH (US); Syed Y. Hasan, Strongsville, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 388 days.

(21) Appl. No.: 10/203,667

(22) PCT Filed: Feb. 16, 2001

(86) PCT No.: PCT/US01/05398

§ 371 (c)(1), (2), (4) Date: Nov. 15, 2002

(87) PCT Pub. No.: WO01/60887

PCT Pub. Date: Aug. 23, 2001

(65) Prior Publication Data

US 2003/0212182 A1 Nov. 13, 2003

Related U.S. Application Data

(60) Provisional application No. 60/183,311, filed on Feb. 17, 2000.

(51) Int. Cl.

| | |
|---|---|
| ***C09J 11/24*** | (2006.01) |
| ***C08F 299/04*** | (2006.01) |
| ***C08G 63/60*** | (2006.01) |

(52) U.S. Cl. ...................... 521/48.5; 521/48; 523/501; 523/523; 524/605; 524/845

(58) Field of Classification Search ................. 523/48, 523/48.5, 501, 523; 524/605, 845; 521/48, 521/48.5

See application file for complete search history.

(56) References Cited

U.S. PATENT DOCUMENTS

| | | | | |
|---|---|---|---|---|
| 3,379,548 A * | 4/1968 | Yun | .......................... | 106/245 |
| 5,371,112 A * | 12/1994 | Sayre et al. | .................. | 521/48 |
| 5,958,601 A * | 9/1999 | Salsman | ..................... | 428/480 |

FOREIGN PATENT DOCUMENTS

| | | |
|---|---|---|
| EP | 0 558 907 A1 * | 9/1993 |
| JP | 405186614 A * | 7/1993 |

* cited by examiner

*Primary Examiner*—Tae H. Yoon
(74) *Attorney, Agent, or Firm*—Vivien Y. Tsang; Robert E. McDonald; Paul R. Katterle

(57) ABSTRACT

The overall performance of water-reducible polymer dispersions, more specifically alkyd dispersions, can be substantially improved by utilizing resins derived from acidolysis reaction products of polyalkylene terephthalates and polyalkylene naphthalates. According to this invention, polymer dispersions can be produced from low acid value polymers and yet have good water dispersibility. When an aqueous coating composition is formulated using the dispersion of this invention, a final coating is formed that has good hydrolytic stability, and when blended with a latex, exhibits improved gloss and wet adhesion.

14 Claims, No Drawings

AQUEOUS POLYMER DISPERSIONS

This application claims the benefit of U.S. provisional patent application No. 60/183,311 filed Feb. 17, 2000.

BACKGROUND OF THE INVENTION

This invention relates to an aqueous polymer dispersion having a low acid value and low volatile organic level utilizing a polyalkylene terephthalate, or polyalkylene naphthalate, as a raw material for producing the resin. The process for making the dispersion includes an acidolysis reaction of polyalkylene terephthalate, or polyalkylene naphthalate, to produce a low acid value resin, and subsequently performing a monomer modification of the resin followed by combining the modified resin with water in the presence of a base to provide water dispersibility. More specifically, the aqueous dispersion of this invention can be an alkyd dispersion.

It has been known to employ water-reducible alkyds as binders to replace solventborne alkyds in order to reduce volatile organic content (VOC). One way to disperse an alkyd in water is to synthesize a high acid value alkyd in a water miscible solvent followed by neutralization and addition of water. Such alkyd resins and film-forming systems based thereon, however, have the disadvantages of unsatisfactory resistance to water, poor hydrolytic stability, and require considerable amounts of volatile amines and solvents for satisfactory dispersion. Another way to disperse an alkyd in water is to emulsify the alkyd in the presence of large amounts of surface-active agents. However, surface-active agents tend to impair the moisture resistance of the resulting coatings. The aqueous coating compositions produced utilizing the dispersions of this invention exhibit good hydrolytic stability and moisture resistance.

Water-reducible alkyds have also been used in aqueous coating compositions to improve the properties of latex coatings. In many instances, high gloss and wet adhesion have been difficult to achieve with latex coatings. Current water-reducible alkyds, such as those described above, when blended with a latex, may improve wet adhesion and gloss, but negatively impact stability or moisture resistance. The aqueous coating compositions produced utilizing the dispersions of this invention as a secondary binder with latex exhibit improved gloss and adhesion properties compared to unmodified latex coatings. These paints also exhibit improved stability and moisture resistance as compared to current water-reducible alkyd modified latex paints.

It has now been found that the overall performance of water-reducible polymer dispersions, more specifically alkyd dispersions, can be substantially improved by utilizing resins derived from acidolysis reaction products of polyalkylene terephthalates and polyalkylene naphthalates. According to this invention, polymer dispersions can be produced from low acid value polymers and yet have good water dispersibility. When an aqueous coating composition is formulated using the dispersion of this invention, a final coating is formed that has good hydrolytic stability, and when blended with a latex, exhibits improved gloss and wet adhesion.

SUMMARY OF THE INVENTION

It is an object of this invention to provide an aqueous polymer dispersion useful for aqueous coating compositions, comprising:

a. a low acid value polymer formed by the reaction product of
   (1) a mixture of compounds resulting from an acidolysis reaction of a polyalkylene terephthalate (or naphthalate) with a member of the group consisting of acid- and anhydride-functional materials; and
   (2) an alcohol, wherein the resulting reaction product of steps (1) and (2) has an acid value of less than 20; and
b. an ethylenically-unsaturated monomer suitable for modifying the low acid value polymer to form a modified polymer resin;

wherein the modified polymer resin has an acid value of less than 30, and wherein surfactants are optionally present and wherein said modified polymer resin is subjected to temperatures higher than its melting point and then combined with water in the presence of a base with high shear dispersing to form the aqueous polymer composition.

It is another object of this invention to provide a process for producing an aqueous polymer dispersion useful for aqueous coating compositions, comprising:

a. producing a low acid value polymer formed by the reaction product of:
   (1) a mixture of compounds resulting from an acidolysis reaction of a polyalkylene terephthalate (or naphthalate) with a member of the group consisting of acid- and anhydride-functional materials; and
   (2) an alcohol, wherein the resulting reaction product of step (1) and (2) has an acid number of less than 20; and
b. performing a monomer modification by reacting an ethylenically unsaturated monomer with the low acid value polymer to form a modified polymer resin at a temperature sufficient to maintain the modified polymer resin in a flowable molten state, wherein the modified polymer resin has an acid value of less than 30;
c. combining the modified polymer resin with water in the presence of a base at temperatures sufficient to maintain the modified polymer resin in a flowable molten state; and
d. forming a dispersion of the molten modified polymer resin by subjecting the modified polymer resin to high shear dispersing; wherein a non-ionic surfactant is optionally added.

A further object of this invention is to provide an aqueous coating composition utilizing a water-reducible polymer dispersion derived from polyalkylene terephthalate, or polyalkylene naphthalate, as a sole binder or blended with latex, and the process for producing the aqueous coating composition. The aqueous coating composition has good hydrolytic stability, and improved gloss and good wet adhesion when blended with a latex.

These and other objects will become more readily apparent from the detailed description, examples and claims which follow below.

DETAILED DESCRIPTION OF THE INVENTION

This invention relates to novel aqueous dispersions of low acid value polymer resins which utilize a polyalkylene terephthalate or polyalkylene naphthalate as a raw material for producing the dispersions. The coating compositions produced utilizing the dispersions of this invention have good hydrolytic stability and improved gloss and wet adhesion properties when blended with a latex. This invention also relates to a process for producing such coatings.

This invention also relates to novel aqueous coating compositions having improved gloss, wet adhesion, and hydrolytic stability comprising water-reducible polymer dispersions utilizing polyalkylene terephthalate, or polyalkylene naphthalate, as the starting material for the production of the polymer. The preferred polyalkylene terephthalate is polyethylene terephthalate (PET). Polyethylene naphthalate (PEN) can also be used. Other polyalkylene terephthalates are polypropylene terephthalate, polybutylene terephthalate, etc. Polymer resin dispersions prepared in accordance with this invention are highly suitable, even without the use of organic solvents, as binders for aqueous coating compositions.

In accordance with the present invention, a polyalkylene terephthalate resin, typically having a structure as shown in FIG. I:

FIG. I:

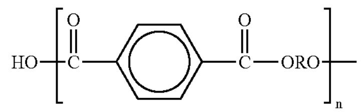

R=C2–C12 straight chain or branched alkylene;

n>1 or a polyalkylene naphthalate having a structure as shown in FIG. II:

FIG. II:

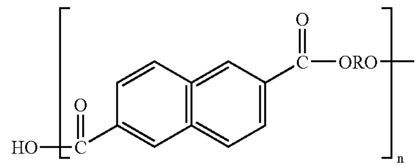

is first digested into lower molecular weight oligomeric units through an acidolysis reaction. The digestion product of the acidolysis reaction is then further reacted with a hydroxy-functional reactant to produce a resin which is further monomer-modified and dispersed into water. For purposes of this invention, the use of polyethylene terephthalate is described; however, it should be recognized by those skilled in the art that other polyalkylene terepthalates, or polyalkylene naphthalates, can be used similarly.

1. PET Source

The actual source of PET usable herein is not of critical importance to this invention. “Virgin” PET, that is PET which is commercially produced specifically as a raw material, is acceptable from a chemical standpoint for use herein. Likewise, recycled or reclaimed PET is acceptable from a chemical standpoint. At the time of this application, there are advantages to the environment (reduction of solid waste) and to the economics of this process (recycled PET is much less expensive than virgin PET) by using recycled or reclaimed PET; and, there are no performance disadvantages to using recycled PET versus virgin PET. Typically, the sources for PET are many and varied. One source of either virgin or recycled PET is material from PET polymer manufacturers. Another source for PET can be post-industrial outlets. A further source is reclaimed PET, such as recycled PET beverage bottles. It should be appreciated that any source of PET is acceptable. Polyethylene naphthalate and polybutylene terephthalate are available similarly.

For purposes of this invention, the PET should be provided in a comminuted form. It can be flaked, granulated, ground to a powder or pelletized. The only constraint placed on the PET at this point is that it is relatively pure; that is, there should not be a level of impurities above about one weight percent (1 wt %) nor should there be any appreciable level of impurities which are chemically reactive within this process. Polyols also used in the manufacture of PET include diethylene glycols, triethylene glycols, neopentyl glycol, cyclohexane dimethanol, butanediols, and propanediols are used as polymer modifiers, and are acceptable as used in this invention.

2. Chemistry of PET-Based Polymers

PET is comprised of repeating units of ethylene glycol and terephthalic acid connected by ester linkages. FIG. I, above, shows a typical PET molecule where R is ethylene. Each repeating unit of PET has a weight average molecular weight of 192 with one equivalent of ethylene glycol and one equivalent of terephthalic acid. By reacting PET with an acid, it is possible to reduce the average chain length of the PET molecules. The chemistry of PET is such that an equilibrium exists between PET, water, ethylene glycol (EG), terephthalic acid (TPA), and the acid used to reduce the chain length. This equilibrium makes it possible to substantially reverse the polymerization process and depolymerize PET into its starting materials.

a. Acidolysis of PET

It is possible to reverse the PET equilibrium and reduce the average chain length of PET with an acid- or anhydride-functional material. The “acidolysis” of PET comprises the reaction of PET with an acid- or anhydride-functional material.

a.1. Acids for Use in Acidolysis Reaction

Suitable acid-functional materials include mono-functional acids such as benzoic, crotonic and sorbic acids; and acids having an acid functionality on average of at least two, such as phthalic acid, isophthalic acid, 1,4-cyclohexane dicarboxylic acid, 1,3-cyclohexane dicarboxylic acid, succinic acid, adipic acid, azelaic acid, maleic acid, fumaric acid, trimellitic acid, trimesic acid, naphthalene dicarboxylic acids, carboxy-terminated polybutadiene, benzophenone tetracarboxylic dianhydride, 4,4'-dicaboxy diphenoxy ethane, and the hydroxy carboxylic acids of piralactone. Other suitable acids include the saturated acids such as butyric, caproic, caprylic, capric, lauric, myristic, palmitic, stearic, 12-hydroxystearic, arachidic, behenic and lignoceric acids; the unsaturated acids such as palmitoleic, oleic, ricinoleic, linoleic, linolenic, eleostearic, licaric, gadoleic and eracic acids; and the oils (and their fatty acids) such as canola, rapeseed, castor, dehydrated castor, coconut, coffee, corn, cottonseed, fish, lard, linseed, oticica, palm kernal, peanut, perilla, safflower, soya, sunflower, tallow, tung, walnut, vernonia, tall and menhaden oils; and blends and mixtures of natural and synthetic oils and fatty acids, particularly those oils and fatty acids with high iodine numbers.

a.2. Anhydrides for Use in Acidolysis Reaction

Representative anhydrides include, phthalic anhydride, 3-nitrophthalic anhydride, 4-nitrophthalic anhydride, 3-flourophthalic anhydride, 4-chlorophthalic anhydride, tetrachlorophthalic anhydride, tetra bromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, and the like.

Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, and the like.

It should be appreciated that other acids and anhydrides should be considered equivalents of those named herein.

The acid- or anhydride functional material will generally have a number average molecular weight below about 2000. Preferably the acid- or anhydride-functional material will have a number average molecular weight of below about 600. Typical number average molecular weights of these materials will range from about 96 to about 600.

Especially preferred acids and anhydrides include the vegetable fatty acids described above and isophthalic acid, hexahydrophthalic acid, 1,4-cyclohexane dicarboxylic acid, 2,6-naphthalene dicarboxylic acid, and mixtures thereof.

Optionally, a catalyst can be used for the acidolysis reaction. If used, suitable catalysts for acidolysis of PET include the traditional transesterification catalysts including stannous octoate, calcium hydroxide, lithium hydroxide, barium hydroxide, sodium hydroxide, lithium methoxide, manganese acetate tetrahydrate, dibutyl tin oxide, butyl stannoic acid, and hydrated monobutyl tin oxide. If used, the catalyst should be present in an amount of from about 0.1 weight % to about 1.5 weight % based upon the total weight of the PET and acid-functional material.

When PET and an acid- or anhydride-functional material are reacted together in the presence of the catalyst (optional) and heat, the high molecular weight PET molecule is broken down into shorter chain fragments. This is accomplished through acidolysis of the ester linkages and exchange by the acid with the terephthalic acid units of the PET molecule. This exchange continues to occur until a new equilibrium is established between the PET, the shorter chain length PET, the shorter chain length PET substituted with the acid, the acid-functional material and terephthalic acid.

Subsequent to acidolysis, the remaining PET fragments and products in equilibrium therewith are predominantly acid-functional. As described further below, the acidolysis reaction products can be reacted with hydroxy-functional materials and the like to form excellent coating compositions. The reaction can be carried out in the presence of a solvent for azeotroping of water or fusion in solventless systems.

b. Further Reactions of the Acidolysis Products

The products of the acidolysis reaction are further reacted with hydroxy-functional materials to produce a polyester product useful in coating compositions. Since the acidolysis reaction products are predominantly acid-functional, they can be further reacted with alcohols including those taught below to obtain polymer compositions useful in coatings. By controlling the amounts and types of reactants, as well as the length and temperature of the reaction as discussed below, one can formulate low acid value systems from the acidolysis reaction products. The products of such reactions include alkyds and polyesters which can be further modified and dispersed in water. The resulting polymer composition can be used by itself or in combination with latex as a film-forming resin in coating compositions. Conventional additives, such as defoamers, UV-stabilizers, pigments, etc. may also be added.

b.1. Alcohols

Generally, the alcohols will have number average molecular weights of below about 4000, and typically, number average molecular weights will range from about 30 to about 4000, and especially 100 to about 600. Methods of preparing alcohols are well known in the art and the method of preparation of the alcohols is not critical to the practice of this invention.

Suitable alcohols include the C1–C22 linear and branched saturated and unsaturated alcohols including, for example, methanol, ethanol, propanol, butanol, hexanol, linoleyl alcohol, trimethylolpropane diallyl ether, allyl alcohol, 2-mercaptoethanol and the like. Additionally, useful alcohols include the hydroxy-functional polyethers, polyesters, polyurethanes, polycaprolactones, etc. as generally discussed in Sections b.1.a. through b.1.e. below.

b.1.a. Saturated and unsaturated polyols include glycerol, castor oil, ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, Bisphenol A tetraethoxylate, dodecahydro Bisphenol A, 2,2'-thio diethanol, dimethylol propionic acid, acetylenic diols, hydroxy-terminated polybutadiene, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, norbomylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, di-trimethylolpropane, trimethylolpropane monoallyl ether, trimethylolhexane, triethylolpropane, 1,2,4-butanetriol, glycerol, pentaerythritol, dimethylolpropane, dipentaerythritol, methyl propanediol, phenolic polyols, etc.

b.1.b. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951. Representative examples include the polypropylene ether glycols and polyethylene ether glycols such as those marketed as NIAX® Polyols from Union Carbide Corporation.

b.1.c. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or NADIC Methyl Anhydride (brand name for methyl bicyclo[2.2.1]heptene-2,3-dicarboxylic anhydride isomers) can also be used.

Representative saturated and unsaturated polyols which can be reacted in stoichiometric excess with the carboxylic acids to produce hydroxy-functional polyesters include the diols taught in b.1.a. and b.1.b., above.

Typically, the reaction between the polyols and the polycarboxylic acids is conducted at about 120° C. to about 200° C. in the presence of an esterification catalyst such as dibutyl tin oxide.

b.1.d. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON® from Shell Chemical Company, and methods of preparation are representatively taught in U.S. Pat. Nos. 2,592,560; 2,582,985 and 2,694,694.

b.1.e. Other useful hydroxy-functional polymers can be prepared by the reaction of an excess of at least one alcohol, such as those representatively described above, with isocyanates to produce hydroxy-functional urethanes. Representative mono-functional isocyanates include allyl isocyanate and tolulyl isocyanate. Representative polyisocyanates include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanato methyl-3,5,5-trimethyl cyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, 4,4'-toluidine, and 1,4-xylylene diisocyanates; benzene 1,3-bis (1-isocyanato-1-methyl ethyl); the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The isocyanates and the alcohols are typically reacted at temperatures of 25° C. to about 150° C. to form the hydroxy-functional polymers.

Especially preferred hydroxy-functional materials in the practice of this invention include, but are not limited to, ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolpropane monoallyl ether, trimethylolhexane, triethylolpropane, ditrimethylolpropane, 1,2,4-butanetriol, glycerol, pentaerythritol, dipentaerythritol, and mixtures thereof.

Most preferred are trimethylolethane, trimethylolpropane, pentaerythritol, dipentaerythritol, and mixtures thereof. It should be appreciated that other alcohols should be considered equivalents of those named herein.

c. Low Acid Value Products Using the Acidolysis Reaction Products

As stated above, the acidolysis reaction products can be further reacted with alcohol to produce low acid value products. The term "low acid value products" is meant to be those compositions having acid values lower than about 20. In order to formulate an acidolysis reaction product to a low acid value of less than about 20, the following stoichiometric proportions of materials should be used. For each mole of repeating unit PET used, from about 1.5 to about 4.0 equivalents of acid/anhydride should be used in the acidolysis reaction, followed by further reaction with about 2.0 to about 4.0 equivalents of hydroxy-functionality. Preferably, the equivalents of acid/anhydride to repeating unit of PET should be about 2.0:1 to about 3.1:1 and the equivalents of OH to PET should be about 2.3:1 to about 3.7:1. Optionally, small amounts of amine or diamine can be substituted for some of the alcohols.

The low acid value products can be used by themselves, in combination with other well known coatings additives, including pigments, flow agents, catalysts, diluents, driers (such as cobalt, zirconium, calcium or organic carboxylates), solvents, ultraviolet light absorbers, and the like, or can be further mixed, reacted, or modified as described below.

The low acid value products (that is, acid values less than about 20) can be reduced in solvents such as xylene, toluene, mineral spirits and the like. Such products can then be allowed to air dry or forced to dry by baking as is well known in the art. A melamine-formaldehyde resin, isocyanate, or other crosslinking agent would preferably be added to facilitate drying in the bake systems. In a preferred embodiment, the low acid value products can be directly modified with monomers, oligomers and polymers to produce water-reducible polymers. The resulting low acid value product is hereinafter referred to as a base polymer.

d. Monomer Modifications of the Base Polymers

In another preferred embodiment, the base polymers of Section (c) can be further modified by direct monomer modification. Direct monomer modification is typically conducted under conditions also well known in the art, including the procedures taught in U.S. Pat. Nos. 4,735,995 and 4,873,281, incorporated herein by reference, as well as by the procedures taught in the Examples below.

When monomerically modifying the base polymers, the incorporation of a sufficient amount of acid-functional monomer material, with or without surfactants, will enable the final polymer products to be reducible in water or other aqueous systems when sufficiently neutralized as discussed below.

Surfactants that can optionally be used for this invention include nonionic surfactants such as, but not limited to, nonylphenol ethoxylates (such as IGEPAL® CO-Series available from Rhodia, Cranberry, N.J.), octylphenol ethoxylates (such as IGEPAL® CA-Series available from Rhodia, Cranberry, N.J.), polyether polyols (such as PLURONIC® or TETRONIC® available from BASF Corporation, Mt. Olive, N.J.), and acetylenic alcohols (such as SURFYNOL® available from Air Products, Allentown, Pa.). The surfactant, if present, is preferably about 1% to about 5% of the total weight of the polymer.

Generally, amounts of acid-functional monomer materials greater than about 5.0% by weight of the total amount of monomer and other ethylenically unsaturated materials will result in a coating composition which is water reducible. Amounts less than the above will generally result in coatings which are not water reducible. Preferably, the monomer-modified base polymer of this invention has low volatile organic levels. More preferably, the volatile organic level of the monomer-modified base polymer is less than 10%.

Suitable monomers for modifying the base polymer include those acrylic, vinylic and ethylenically unsaturated materials taught to be useful when reacted with unsaturated acids, such as acrylic acid, methacrylic acid and itaconic acid. Suitable vinyl monomers are, for example, alkylacrylates, alkylmethacrylates, hydroxyalkyl acrylates, hydroxyalkyl methacrylates, acrylamides, methacrylamides, vinyl aromatic hydrocarbons, vinyl aliphatic hydrocarbons or mixtures thereof. While acrylic acid and methacrylic acid are preferred ethylenically unsaturated carboxylic acids, other suitable ethylenically unsaturated carboxylic acid monomers may be used such as beta-carboxyethyl acrylates, itaconic acid, crotonic acid, maleic acid, and half esters of maleic and fumaric acids, such as butyl hydrogen maleate and ethyl hydrogen fumarate, in which one carboxyl group is esterified with an alcohol. Examples of other ethylenically unsaturated monomers which can be used for making the vinyl polymer include the alkyl acrylates, such as methyl acrylate, ethyl acrylate, butyl acrylate, propyl acrylate, 2-ethylhexyl acrylate and isobornyl acrylate; the alkyl methacrylates, such as methyl methacrylate, butyl methacrylate, 2-ethylhexyl methacrylate, decyl methacrylate, lauryl methacrylate, acetoacetoxyethyl methacrylate, dimethylaminoethyl methacrylate, and allyl methacrylates and isobornyl methacrylate; hydroxyalkyl acrylates and methacrylates such as hydroxyethyl acrylate, hydroxypropyl acrylate, hydroxyethyl methacrylate, hydroxypropyl methacrylate; acrylamides and methacrylamides, diacetone acrylamide, and unsaturated nitriles such as acrylonitrile, methacrylonitrile, and ethacrylonitrile. Other ethylenically unsaturated monomers (vinyl monomers) which can be used in addition to the acrylic monomers include: vinyl aromatic hydrocarbons (such as styrene, alpha-methyl styrene, and vinyl toluene); and vinyl aliphatic hydrocarbons (optionally substituted, for example, by halogen atoms) such as vinyl acetate, vinyl versatates, and vinyl chloride.

The vinyl polymerization of the monomer compositions generally can be conducted at from 80° C. to 160° C., and typically are conducted at from 100° C. to 150° C.

A vinyl polymerization initiator is employed in the polymerization of the vinyl monomer composition(s). Examples of initiators include, but are not limited to: peroxyesters such as tertiary-butyl perbenzoate; azo compounds such as alpha, alpha'-azobis(isobutyronitrile); peroxides such as benzoyl peroxide and cumene hydroperoxide; peracetates such as tertiary butyl peracetate; percarbonates such as isopropyl percarbonate, peroxycarbonates such as butyl isopropyl peroxy carbonate, and similar compounds. The quantity of initiator employed can be varied considerably; however, in most instances, it is desirable to utilize from about 0.1 to about 10 percent by weight based on the weight of ethylenically unsaturated monomers used. Where desired, a chain modifying agent or chain transfer agent can be added to the polymerization mixture for control of the molecular weight of the resulting resin. Examples of such agents include the mercaptans, such as tertiary dodecyl mercaptan, dodecyl mercaptan, octyl mercaptan, and hexyl mercaptan, etc.

The vinyl polymerization reactions for preparing a resin composition of the invention generally are carried out in the presence of an organic solvent, preferably only a limited amount of organic solvent being used so as to minimize the organic solvent content of the resulting product. In the preferred method of preparing a resin of the invention, the base polymer serves as a polymerization medium for preparation of the modified polymer thereby significantly reducing the amount of organic solvent needed. The amount of monomeric materials used for modification is in the range of about 10% to about 80%, and more preferably, about 20% to about 60% based on total modified resin solids. The modified polymer preferably has an acid value of less than 30.

e. Dispersion Process

The production of the dispersions of this invention is effected with a dispersing method to incorporate the modified polymer, from section d, into water. In the dispersion process of the present invention, the modified polymer resin is initially liquefied by heating the resin to at least its melting point, and more preferably, to a temperature of at least 5° above its melting point so the polymer maintains a molten and flowable state, but below the decomposition temperature of the polymer. Typically, the modified polymer resin will melt in the temperature range from about 120° C. to about 140° C. A separate vessel of water, containing a base for neutralization of the carboxylic acids on the polymer, is heated to between 20° C. and 70° C. The base can be an amine compound or an alkali hydroxide. Water solubility or water dilutability may be given to the resin by effecting neutralization of acidic groups, such as carboxyl, with a basic material, e.g. monomethylamine, dimethyl amine, trimethylamine, monoethylamine, triethylamine, monoisopropylamine, diisopropylamine, diethylene triamine, triethylenetetramine, monoethanolamine, diethanolamine, triethanolamine, monoisopropanolamine, diisopropanolamine, dimethylethanolamine, morpholine, methyl morpholine, piperazine, ammonia, sodium hydroxide, potassium hydroxide and the like, with or without surfactants. Typically enough base is added to neutralize some of the acid on the polymer. The water phase and the polymer phase are brought into contact with one another and immediately dispersed in a high shear mill or a homogenizer. The high shear is necessary to break the polymer particle down to a submicron level. Without the use of high shear chopping, the polymer will not disperse in water. The process can be continuous or in batch mode where the tank or mixing vessel contains the water phase. Once the polymer is dispersed in water, the pH is adjusted to 7.6–8.2 and the percent solids are adjusted to 35–55% by weight. Preferably, the resulting polymer dispersion has a volatile organic level of less than 10% and an acid number of less than 30.

3. Coating Compositions

The above polymer dispersion can be used by itself as a sole binder, or in combination with a latex as a film forming resin in coating compositions.

Examples of latex compositions in which the polymer dispersion products may be blended include, for example, those based on resins or binders of vinyl acrylic, styrene acrylic, all acrylic, copolymers of acrylonitrile wherein the comonomer is a diene like isoprene, butadiene or chloroprene, homopolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anhydrides like maleic anhydrides, homopolymers and copolymers of acrylic and methacrylic acid and their esters and derivatives, polybutadiene, polyisoprene, butyl rubber, natural rubber, ethylene-propylene copolymers, olefins resins like polyethylene and polypropylene, polyvinyl alcohol, carboxylated natural and synthetic latexes, epoxies, epoxy esters and other similar polymeric latex materials. The ratio of the polymers of the present invention to the latexes in a coating composition covers a wide range depending on the desired properties of the final coating product and intended uses. For example, the product of Section 2.e. of the present invention may be present from about 2 weight percent to about 100 weight percent of the total binder.

The coatings of this invention can be cured oxidatively with metal driers, or semi-drying oils or fatty acids can be incorporated into the resin. These coatings, whether containing or not containing oxidative moieties, can also be cured by the addition of crosslinking agents cured either at room temperature or at elevated temperatures. Metal driers can include cobalt, zirconium, or calcium carboxylates, for example. Crosslinking agents can include isocyanates, blocked isocyanates, melamine-formaldehyde resins, urea-formaldehyde resins, aziridines, titanates, carbodiimides, epoxides, epoxy resins, and other crosslinkers known to those skilled in the art. Aqueous dispersions of the isocyanates, blocked isocyanates, melamine-formaldehyde resins, urea-formaldehyde resins, aziridines, titanates, carbodiimides, epoxides, epoxy resins, and other crosslinkers can also be used. Crosslinking agents can be added to the dispersions of this invention or to blends of these dispersions with latexes or other polymers known to one skilled in the art.

The coatings of this invention may typically be applied to any substrate such as metal, plastic, wood, paper, ceramic, composites, dry wall, and glass, by brushing, dipping, roll coating, flow coating, spraying or other method conventionally employed in the coating industry.

Opacifying pigments that include white pigments such as titanium dioxide, zinc oxide, antimony oxide, etc. and organic or inorganic chromatic pigments such as iron oxide, carbon black, phthalocyanine blue, etc. may be used. The coatings may also contain extender pigments such as calcium carbonate, clay, silica, talc, etc.

The following examples have been selected to illustrate specific embodiments and practices of advantage to a more complete understanding of the invention. Unless otherwise stated, "percent" is percent-by-weight, PVC is pigment volume concentration, NVM is non-volatile mass, Mn is number average molecular weight, Mw is weight average molecular weight, Cps is centipoise, and Pd is polydispersity.

EXAMPLE I

Preparation of Low Acid Value Base Polymer—Acidolysis of PET

A 3 liter, 4-necked round bottom flask equipped with inert gas, mechanical stirrer, Barrett tube and Friedrich's condenser is charged with 423 grams of polyethylene terephthalate, 822 grams of soya fatty acid, 3.3 grams of dibutyl tin oxide catalyst, and 133 grams of isophthalic acid. The contents are heated to 490° F. and held until all contents had melted. The solution is cooled to 325° F. and 206 grams of trimethylolethane is added. The contents are heated to 460° F. and held for an acid value of less than 12. Once reached, heat is removed and the contents allowed to cool. The final resin product had an NVM of 97.9, viscosity of 12,200 cps (using Brookfield LVT#3 at 25 C., 12 rpm), acid value of 6.5, Mw of 3619, Mn of 1639 and Pd of 2.20.

EXAMPLE II

Preparation of Low Acid Value Base Polymer—Acidolysis of PET

A 3 liter, 4-necked round bottom flask equipped with inert gas, mechanical stirrer, Barrett tube and Friedrich's condenser is charged with 764.72 grams of polyethylene terephthalate, 1124.42 grams of tall oil fatty acid, 9.5 grams of dibutyl tin oxide catalyst. The contents are heated to 490° F. and held until all contents have melted and a clear solution is obtained. The solution is cooled to 325° F. and 301.62 grams of trimethylolethane is added. The contents are heated to 465° F. and held for an acid value of less than 10. Once reached, heat is removed and the contents allowed to cool. The final base polymer resin product has an NVM of 98.3, viscosity of 11,200 cps (using Brookfield LVT#3, 12 rpm), acid value of 6.6, Mz of 4464, Mw of 2522, Mn of 1418 and Pd of 1.78.

EXAMPLE III

Direct Monomer Modification 511 grams of the resin of Example I and 13 grams of propylene glycol monobutyl ether are charged in a reaction vessel and heated to about 138° C. Added to the vessel over a 3.5 hour period is 333.3 grams of methyl methacrylate, 30.2 grams of acrylic acid, and 109.6 grams of ethyl hexyl acrylate. A second feed of 5.7 grams of t-butyl perbenzoate (2.5% in propylene glycol monobutyl ether) is added over the same time period. Upon complete addition of both feeds, a chase of 5.6 grams t-butyl perbenzoate in 10 grams of propylene glycol monobutyl ether is added over a 1.5 hour time period. Heat is held at 138° C. for one hour. The final monomer-modified polymer had an acid value of 29.

EXAMPLE IV

Direct Monomer Modification 600 grams of the base polymer of Example II is charged in a two liter flask equipped with condenser, agitator and nitrogen supply. The contents are heated to 138° C. and held while the monomer mixture comprising 37.5 grams acrylic acid, 200 grams methyl methacrylate, 135 grams 2-ethylhydroxyacrylate, 200 grams styrene, 8.0 grams t-butyl perbenzoate, and 0.72 grams dodecyl mercaptan are added to the base polymer over three hour period. When monomer addition is complete, the temperature is held at 138°–140° C. for one hour. After the hold time, a mixture of 38.0 grams Acrosolv PNP (available from Lyondell, Houston, Tex.) and 4.5 grams t-Butylperbenzoate is added over a 2.5 hour period, and then held for one half hour at 138° C. to 140° C.

EXAMPLE V

Dispersion in Water

The dispersion is produced with a high shear rotor stator mill. The composition of Example III is maintained at 138° C., and is added slowly to the mill already charged with 1200 grams water and 35 grams of triethylamine at 70° C. The mixture is mixed until the composition of Example III is completely incorporated and finely dispersed. The resulting polymer dispersion is adjusted to have a volatile organic level of 5% on solids, NVM of 45%, a pH of 7.8, and a viscosity of 1000 cps (Brookfield LVT#3, 30 rpm at 25 C.).

EXAMPLE VI

Dispersion in Water

The composition of Example IV is maintained at 138° C., and added slowly to a high shear rotor stator mill already charged with 1237 grams of water and 28 grams of triethylamine at 70° C. The mixture is mixed until the composition of Example IV is completely incorporated and finely dispersed, then 27 grams of Pluronic L-62 (available from BASF Corporation, Mt. Olive, N.J.) and 50 grams Igepal CO-997 (Rhodia, Cranberry, N.J.) are added. The dispersion is filtered through 100 mesh filter cloth. The resulting dispersion is adjusted to have NVM of 45.9%, pH of 8.1, and a visocity of 510 cps (Brookfield LVT#3, 30 rpm at 25 C.).

EXAMPLE VII

Preparation of an Aqueous Coating Composition Using the Polymer Dispersion of Example V as a Secondary Binder An aqueous coating composition can be prepared as follows. Five grams of triethylamine and 5 grams of dispersing agent are added to 90 grams of water in a stainless steel pot under slow agitation using a grind blade. This is followed by the addition of 210 grams of architectural grade titanium dioxide, and 5 grams of silicone defoamer. The resulting slurry is ground at high shear (~3000 rpm) until a Hegman grind of at least 7 is obtained. The speed is reduced to ~1200 rpm, and followed by the addition of 50 grams of water, and allowed to mix for 5 minutes. The grind blade is replaced with a propeller type, mixing blade before proceeding to add 22 grams of 2-butoxy ethanol, 445 grams of vinyl acrylic latex, and 111 grams of the polymer dispersion (of Example V). This is allowed to mix for 5 minutes before completing the batch with 0.5 grams of biocide, 3.5 grams of 5% cobalt hydrocure drier, 1 grams of 6% manganese catalyst, and 15 grams of urethane thickener. The final pH is adjusted to a minimum of 9.0 with triethylamine, and the Krebs unit viscosity is adjusted to a range of 97 to 102 with urethane thickener. The resulting coating composition has a PVC of ~16, a NVM of ~40, and has a VOC of less than 120 grams/liter. This coating composition exhibits excellent wet adhesion properties, and a measured 60° gloss in excess of 80 units.

EXAMPLE VII

Preparation of an Aqueous Coating Composition Using the Polymer Dispersion of Example V as a Sole Binder Five grams of triethylamine and 5 grams of a dispersing agent are added to 70 grams of water in a stainless steel pot under slow agitation using a grind blade. This is followed by the addition of 210 grams of titanium dioxide and 5 grams of a defoamer, and the resulting slurry ground at about 3000 rpm until a Hegman grind of at least 7 is obtained. The mixing speed is reduced to about 1500 rpm and followed by the addition of 135 grams of water and mixing for about 5 minutes. The grind blade is replaced with a mixing blade before proceeding to add 32 grams of propylene glycol n-butyl ether, 560 grams of the polymer dispersion (of Example V), 2.5 grams of 5% Calcium Hydro CEM drier, 1.5 grams of 5% Cobalt Hydrocure II drier, 3.2 grams of 12% Zirconium Hydro CEM drier (all of the above driers available from OMG Inc., Cleveland, Ohio), and Proxcel GXL biocide (available from Zeneca, Wilmington, Del.). The final pH is adjusted to 9.0 with triethylamine, while viscosity is adjusted to 95 Krebs Unit using Acrysol RM-825 (available from Rohm & Haas, Philadelphia, Pa.).

EXPERIMENTAL METHODS

Measurement of Gloss:

A drawdown of the test sample on a Leneta WB panel is made with a 4 mil gap blade and dried at 25° C./50% relative humidity for 24 hours. The specular gloss is measured using a GLOSSGARD II Glossmeter (Byk-Gardner, Silver Springs, Md.) as per ASTM D 523-89 at one of three angles of reflection, i.e., 20, 60, or 85 degrees.

Measurement of Wet Adhesion:

The panel for the wet adhesion test is a Leneta P121-10N panel that has been coated with gloss polymer and cured for 30 days. 10 mil wet film is cast over the panel at ambient conditions, then the film is allowed to dry for 24 hours and then cross-hatched into ¼" squares, then immersed in water for 30 minutes, followed by scrub machine with wet brush using Leneta standardized scrub medium SC-2. Results reported as cycles to failure, or >1000 cycles if 100% of coating remains at 1000 cycles.

Hydrolytic Stability Tests:

The coating is placed in an oven at 140 F., for 4 weeks. Changes to viscosity, pH, and appearance (such as settling, syneresis) are measured for the resin as a sole binder and as a latex blend.

Table I shows how blends of latexes perform in the gloss and wet adhesion tests:

TABLE I

| Ex. | Primary Binder | Modifier | Ku Viscosity | pH | Gloss (60) | Wet Adhesion (Cycles) |
|---|---|---|---|---|---|---|
| 1 | 100% VA | None | 84 | 9.5 | 4 | 30 |
| 2 | 80% VA | 20% WR | 83 | 9.3 | 31 | 3 |

TABLE I-continued

| Ex. | Primary Binder | Modifier | Ku Viscosity | pH | Gloss (60) | Wet Adhesion (Cycles) |
|---|---|---|---|---|---|---|
| 3 | 80% VA | 20% PET | 81 | 9.2 | 38 | 150 |
| 4 | 70% VA | 30% WR | 102 | 9.4 | 38 | 1 |
| 5 | 70% VA | 30% PET | 94 | 9.2 | 44 | 150 |
| 6 | 100% SA | NONE | 86 | 9.4 | 35 | >1000 |
| 7 | 80% SA | 20% WR | 86 | 9.3 | 54 | 400 |
| 8 | 80% SA | 20% PET | 90 | 9.3 | 66 | >1000 |
| 9 | 70% SA | 30% WR | 84 | 9.2 | 65 | 200 |
| 10 | 70% SA | 30% PET | 108 | 9.3 | 81 | >1000 |

VA = Vinyl Acrylic Latex
SA = Styrene Acrylic Latex
PET = Polyethylene Terephthalate-Waterborne Polymer (Example V)
WR = Water Reducible Polymer (Kelsol ® 3922 adjusted to 40% solids from Reichhold Resins)

Table II shows results of hydrolytic stability testing:

TABLE II

| Ex. | Primary Binder | Modifier | Ku Viscosity | pH | Gloss (60) | Settling/ Syneresis |
|---|---|---|---|---|---|---|
| 1 | 100% VA | None | 87 | 9.3 | 4 | None |
| 2 | 80% VA | 20% WR | n/a | n/a | n/a | Settled |
| 3 | 80% VA | 20% PET | 85 | 9.1 | 44 | None |
| 4 | 70% VA | 30% WR | n/a | n/a | n/a | Settled |
| 5 | 70% VA | 30% PET | 96 | 9.2 | 49 | None |
| 6 | 100% SA | NONE | 89 | 9.2 | 32 | None |
| 7 | 80% SA | 20% WR | n/a | n/a | n/a | Settled |
| 8 | 80% SA | 20% PET | 94 | 9.1 | 69 | None |
| 9 | 70% SA | 30% WR | n/a | n/a | n/a | Settled |
| 10 | 70% SA | 30% PET | 102 | 8.9 | 84 | None |

VA = Vinyl Acrylic Latex
SA = Styrene Acrylic Latex
PET = Polyethylene Terephthalate-Waterborne Polymer (Example V)
WR = Water Reducible Polymer (Kelsol ® 3922 adjusted to 40% solids from Reichhold Resins)

What is claimed is:

1. A process for producing a water-reducible polymer dispersion useful for aqueous coating compositions, comprising:
(A) producing a modified polymer resin having an acid value less than 30, wherein said modified polymer resin is formed by
(1) producing a low acid value polymer formed by reacting
(a) a mixture of an acidolysis reaction product of a polyalkylene terephthalate with a member of the group consisting of acid- and anhydride-functional materials, and
(b) an alcohol; wherein the low acid value polymer has an acid value of less than 20; and
(2) performing a monomer modification of the low acid value polymer with an ethylenically unsaturated monomer;
(B) subjecting the modified polymer resin to temperatures higher than the melting point of the modified polymer resin to maintain the modified polymer resin in a molten and flowable state;
(C) combining the molten modified polymer resin with water in the presence of a base at temperatures sufficient to maintain the modified polymer resin in a molten state; and
(D) forming a dispersion of the molten modified polymer resin by subjecting the modified polymer resin to high shear dispersing; and wherein a surfactant is optionally added.

2. The process of claim 1, wherein at least one ethylenically-unsaturated monomer is an acid-functional ethylenically-unsaturated monomer.

3. The process of claim 1, wherein the acid-functional monomer is at least 5 weight % of the total ethylenically unsaturated monomer present.

4. The process of claim 1, wherein the polymer dispersion has a volatile organic level of less than 10%.

5. The dispersion of claim 1, wherein for each mole of polyethylene terephthalate, from about 1.5 to about 4.0 equivalents of acid/anhydride and from about 2 to about 4 equivalents of hydroxy functionality are present.

6. The process of claim 1, wherein the ethylenically unsaturated monomer is in the range of about 10% to about 80% by weight based on the total weight of the modified resin solids.

7. The process of claim 1, wherein the surfactant is a non-ionic surfactant.

8. A process for producing a water-reducible polymer dispersion useful for aqueous coating compositions, comprising:
(A) producing a modified polymer resin having an acid value less than 30, wherein said modified polymer resin is formed by
(1) producing a low acid value polymer by reacting
(a) a mixture of an acidolysis reaction product of a polyalkylene naphthalate with a member of the group consisting of acid- and anhydride-functional materials, and
(b) an alcohol, wherein the low acid value polymer has an acid value of less than 20; and
(2) performing a monomer modification of the low acid value polymer with an ethylenically unsaturated monomer;
(B) subjecting the modified polymer resin to temperatures higher than the melting point of the modified polymer resin to maintain the modified polymer resin in a molten and flowable state;
(C) combining the molten modified polymer resin with water in the presence of a base at temperatures sufficient to maintain the modified polymer resin in a molten state; and
(D) forming a dispersion of the molten modified polymer resin by subjecting the modified polymer resin to high shear dispersing;
wherein a surfactant is optionally added.

9. The process of claim 8, wherein at least one ethylenically-unsaturated monomer is an acid-functional ethylenically-unsaturated monomer.

10. The process of claim 9, wherein the acid-functional monomer is at least 5 weight % of the total ethylenically unsaturated monomer present.

11. The process of claim 8, wherein the polymer dispersion has a volatile organic level of less than 10%.

12. The dispersion of claim 8, wherein for each mole of polyalkylene naphthalate, from about 1.5 to about 4.0 equivalents of acid/anhydride and from about 2 to about 4 equivalents of hydroxy functionality are present.

13. The process of claim 8, wherein the ethylenically unsaturated monomer is in the range of about 10% to about 80% by weight based on the total weight of the modified polymer resin solids.

14. The process of claim 8, wherein the surfactant is a non-ionic surfactant.

* * * * *